United States Patent [19]

Hasegawa et al.

[11] Patent Number: 4,572,149
[45] Date of Patent: Feb. 25, 1986

[54] AIR/FUEL RATIO CONTROL SYSTEM FOR AN INTERNAL COMBUSTION ENGINE

[75] Inventors: Shumpei Hasegawa, Niiza; Michitaka Shiraiwa, Kamifukuoka; Sadatomo Tsuchiya, Wako, all of Japan

[73] Assignee: Honda Giken Kogyo Kabushiki Kaisha, Tokyo, Japan

[21] Appl. No.: 601,535

[22] Filed: Apr. 18, 1984

[30] Foreign Application Priority Data

Apr. 28, 1983 [JP] Japan ................................. 58-075463

[51] Int. Cl.$^4$ ............................................. F02B 3/00
[52] U.S. Cl. ..................................... 123/589; 123/440
[58] Field of Search ............... 123/339, 440, 585, 589, 123/489

[56] References Cited

U.S. PATENT DOCUMENTS

| 4,109,623 | 8/1978 | Rivere | 123/440 |
|---|---|---|---|
| 4,287,865 | 9/1981 | Seitz | 123/440 |
| 4,292,946 | 10/1981 | Masaki | 123/440 |
| 4,335,699 | 6/1982 | Totsune | 123/588 |
| 4,378,773 | 4/1983 | Ohgami | 123/440 |
| 4,402,293 | 9/1983 | Ohgami | 123/440 |
| 4,407,243 | 10/1983 | Otsuka | 123/440 |
| 4,407,247 | 10/1983 | Masaki | 123/440 |
| 4,495,922 | 1/1985 | Fujimura | 123/589 |

Primary Examiner—Ronald B. Cox
Attorney, Agent, or Firm—Pollock, VandeSande and Priddy

[57] ABSTRACT

An air/fuel ratio control system for an internal combustion engine equipped with a three-way catalytic converter, comprises first and second fluid supply passages for supplying, for example, a secondary air or a supplemental fuel to the engine, and a flow control valve disposed in the first fluid supply passage for varying the amount of the secondary air or the supplemental fuel in accordance with a detected condition of the air/fuel ratio. An open/close valve is disposed in the second fluid supply passage for opening and closing the communication through the second fluid supply passage without regard to the air/fuel ratio signal and with a predetermined period which is shorter than a normal period of turning over of the air/fuel signal, thereby reducing the deviation of the actual air/fuel ratio from a central value of the air/fuel ratio control, to improve the efficiency of purification of emission by means of the three-way catalytic converter.

4 Claims, 12 Drawing Figures

AIR/FUEL RATIO CONTROL SYSTEM FOR AN INTERNAL COMBUSTION ENGINE

BACKGROUND OF THE INVENTION

1. Field of the Invention

The present invention relates to an air/fuel ratio control system for an internal combustion engine

2. Description of Background Information

In an internal combustion engine provided with a three-way catalytic converter in the exhaust system, the air/fuel ratio of the mixture is controlled around a stoichiometric value (14.7:1 for example) in accordance with the composition of the exhaust gas and the operational conditions of the engine in order to provide an optimum operation of the three-way catalytic converter.

This type of air/fuel ratio control system is generally constructed to perform either one of an integral operation and a proportional-integration operation in accordance with an air/fuel ratio signal.

Further, it is known that in the case of air/fuel ratio control systems for an internal combustion engine equipped with the three-way catalytic converter, a higher efficiency of the purification of the exhaust gas is obtained when the deviation of the air/fuel ratio from the stoichiometric value is smaller and at the same time the period of inversion or turnover of the direction of the air/fuel ratio control, namely the control toward the rich side and the control toward the lean side, is shorter, or in other words, the frequency of the change in the direction of the air/fuel ratio control is higher.

However, in the case of the air/fuel ratio control system with the integration operation, it is difficult to shorten the period of the inversion of the direction of the air/fuel ratio conrol. This is because there is a relatively large delay of response during the change of the direction of the air/fuel ratio control after the actual air/fuel ratio has changed from lean to rich, or from rich to lean.

SUMMARY OF THE INVENTION

An object of the invention is therefore to provide an air/fuel ratio control system with an integration operation, in which the efficiency of the purification of the exhaust gas is improved by shortening the period of the turnover of the direction of the air/fuel ratio control.

According to the present invention, the air/fuel ratio control system for an internal combustion engine is provided with a first fluid supply passage and a second fluid supply passage, the air/fuel ratio is detected from the composition of the exhaust gas, the sectional area of the first fluid passage is gradually varied by means of a flow control valve operated according to the detected air/fuel ratio, and the second fluid supply passage is opened or closed by means of an open/close valve at a predetermined time period without respect to the detected air/fuel ratio.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitative of the present invention, and wherein.

DETAILED DESCRIPTION OF THE PREFERRED EMBODIMENTS

Figure 1:
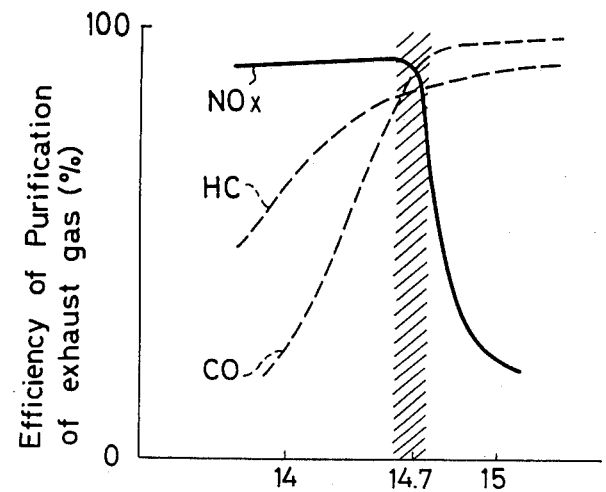
FIG. 1 is a diagram showing the relation between the air/fuel ratio and the efficiency of purification of the emission by means of a three-way catalytic converter.

Before entering into the explanation of the embodiment of the present invention, reference is first made to FIG. 1 in which the efficiency of the three-way catalytic converter with respet to the air/fuel ratio is illustrated. As shown, the purification efficiency for Nitrogen Oxides (NOx) becomes optimum when the air/fuel ratio is richer than the stoichiometric value (14.7). On the other hand, the purification efficiency for Hydro Carbons (HC) and Carbon Monoxide (CO) becomes optimum when the air/fuel ratio is leaner than the stoichiometric value. Therefore, it is desirable to control the air/fuel ratio at the stoichiometric value.

Figure 2:
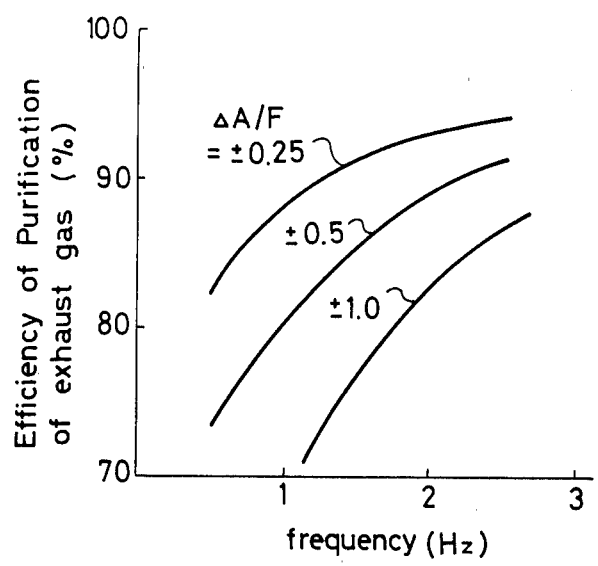
FIG. 2 is a diagram showing the relation between the frequency of turnover of the direction of the air/fuel ratio control and the efficiency of the purification of emission.

Reference is next made to FIG. 2, in which the relation between the purification efficiency and the deviation of the air/fuel ratio from the stoichiometric value and also the period of inversions of the direction of the air/fuel ratio control is illustrated. As shown, the efficiency of purification becomes higher when the width ($\Delta A/F$) of the deviation of the air/fuel ratio from the stoichiometric value is smaller and at the same time the interval of the change in the direction of the air/fuel ratio control is smaller, in other words, the frequency of the change is higher.

Turning to the schematic diagram of FIG. 3, the first embodiment of the present invetion will be explained hereinafter.

As shown, this embodiment takes the form of the so-called air intake side secondary air supply system and in which intake air taken from an air inlet port 1 is supplied to an internal combustion engine 4 via an air cleaner 2 and intake air passage 3. In the intake air passage 3, a throttle valve 5 is provided in the middle. Further, a venturi 6 is formed upstream from the throttle valve 5 and a choke valve 7 is disposed upstream of the venturi 6. In the wall surface of the intake air passage 3, in proximity to the position of the throttle valve 5, a vacuum detection hole 8 is provided in such a manner that the vacuum detection hole 8 is located upstream from the throttle valve 5 when the throttle valve 5 is closed, and located downstream from the throttle valve 5 when the throttle valve 5 is opened. A second vacuum detection hole 9 is also provided to the venturi 6. A portion of the air intake system downstream of the throttle valve 5, i.e., the intake manifold is communicated with a portion around an air outlet port of the air cleaner 2 via an air intake side secondary air passage 11. A middle part of the secondary air passage 11 is further divided into two air control passages 11a and 11b so that the secondary air flowing through the secondary air passage 11 is shunt into two flows. In the air control passage 11a, there is provided an air control valve 12 which consists of a vacuum chamber 12a, a valve chamber 12b acting as a part of the secondary air passage 11, a diaphragm 12c defining a wall of the vacuum chamber 12a, and a needle type valve element 12e placed in the valve chamber 12b and applied with a biasing force of a valve spring 12d via the diaphragm 12c to close the secondary air passage 11. With this construction, the cross sectional area of the secondary air passage 11 is increased as the magnitude of the vacuum acting upon the vacuum chamber 12a increases.

To the vacuum chamber 12a of the air control valve 12, there is applied a vacuum pressure from a three-way electro-magnetic valve 13 via a pressure passage 14. The electro-magnetic valve 13 includes a solenoid 13a, a valve chamber 13b communicated with the vacuum chamber 12a via the pressure passage 14, and a valve element 13c which is mounted in the valve chamber 13b and magnetically coupled with the solenoid 13a. The valve chamber 13b is communicated with a vacuum control part 31 which produces a first control pressure via a vacuum passage 15 for introducing the first control pressure, and is also communicated with the part of the secondary air passage 11 upstream from the air control valve 12 via an atmospheric pressure passage 16 for introducing a second control pressure. When the solenoid 13 is not energized, the side of the vacuum passage 15 is closed, and at the same time the pressure passage 14 and the atmospheric pressure passage 16 are communicated with each other via the valve chamber 13b. On the other hand, when the solenoid 13a is energized, the side of the atmospheric pressure passage 16 is closed, and at the same time the pressure passage 14 and the vacuum passage 15 are communicated with each other.

Further, the vacuum passage 15 is provided with an orifice 17, and the atmospheric pressure passage 16 is provided with an orifice 19.

The solenoid 13a of the electro-magnetic valve 13 is connected to a control circuit 22 via a drive circuit 21. In addition, an oxygen concentration sensor (oxygen sensor hereinafter) 23 is disposed in an exhaust passage 10 of the engine 4 to produce a voltage signal having a level corresponding to the oxygen concentration in the exhaust gas, oxygen sensor 23 being connected to the control circuit 22.

Also an air control passage 11b which forms the aforementioned second fluid supply passage is provided in parallel with the secondary air supply passage 11a, and an air control valve 24 is provided in the air control passage 11b.

The air control valve 24 is constructed in the same manner as the air control valve 12 and has a vacuum chamber 24a, a valve chamber 24b, a diaphragm 24c, valve spring 24d and a needle type valve element 24e. The vacuum chamber 24a is communicated with a part of the vacuum passage on the side of the vacuum control part 31 from the orifice 17, by means of a vacuum passage 25. Further, in the air control passage 11b, downstream of the air control valve 24, there is provided an electro-magnetic valve 26 which has a solenoid 26 connected to a drive circuit 27 which receives an on/off signal from an on/off signal generating circuit 28. The electro-magnetic valve 26 closes the air control passage 11b when the solenoid 26a is de-energized. On the other hand, when the solenoid 26a is energized, the electro-magnetic valve 26 makes the communication through the air control passage 11b.

The vacuum control part 31 consists of a vacuum responsive regulator valve 32 and an air valve 33 which consist of a vacuum chamber 32a or 33a, a diaphragm 32c or 33c, a valve spring 32d or 33d, and a valve element 32e or 33e respectively. The vacuum chamber 32a is disposed in the middle of a control air passage 35 which leads from an atmospheric air inlet port 34 with a filter to a part of the intake air passage downstream of the throttle valve 5, and the valve chamber 33b is disposed in the control air passage 35 downstream of the vacuum chamber 32a. The valve element 33e is applied with a resilient force of the valve spring 33d via the diaphragm 33c so as to close the control air passage 35. The vacuum chamber 33a is comunicated with the vacuum detection hole 8 via a vacuum passage 36, and similarly, the valve chamber 32b is communicated with the vacuum detection hole 9 via a vacuum passage 37. The valve chamber 32b is communicated with the vacuum passage 36 and the valve element 32e is applied with a resilient force of the valve spring 32d via the diaphragm 32c so that the communication between the valve chamber 32b and the vacuum passage 36 is closed by the valve element 32e. In addition, in the control air passage 35, a pair of orifices 38 and 39 are provided respectively upstream and downstream of the vacuum chamber 32a. Further, orifices 40 and 41 are provided in the vacuum passage 36 and the vacuum passage 37 respectively.

A part of the vacuum passage 36 of the side of the valve chamber 32b and the vacuum chamber 33a from the orifice 40, is communicated with the vacuum passage 15.

The operation of the thus constructed air intake side secondary air supply system according to the present invention will be explained hereinafter.

The operation of the vacuum control part 31 is as follows. When a vacuum Pc from the vacuum detection hole 8 is applied to the vacuum chamber 33a via the vacuum passage 36 in accordance with the operation of the engine 4, the valve element 33e is displaced in a direction to open the air valve 33 if the vacuum pressure Pc is greater than the resilient force of the valve spring 33d. By the opening of the air valve 33, outside air from the atmospheric air inlet port 34 is introduced to the intake air passage 3 downstream of the throttle valve 5, via the control air passage 35. The vacuum P1 and the vacuum P2 respectively in the vacuum chamber 32a and the valve chamber 33b through which the outside air travels, are determined in accordance with the aperture ratio of the orifices 38 and 39 respectively.

In this condition, if the differential pressure between the vacuum Pv from the vacuum detection hole 9, acting in the valve chamber 32b and the vacuum P1 is greater than the resilient force of the valve spring 32d, the valve element 32e is displaced in the direction to open the valve 32. By this opening of the control valve 32, a part of the vacuum Pv is directed to dilute the vacuum past the orifice 40 to produce a vacuum Pe acting in the vacuum chamber 12a when the electro-magnetic valve 13 is activated.

Subsequently, due to the drop of the vacuum Pe, the opening degree of the air valve 33 is decreased to reduce the amount of the air flowing through the control air passage 35. By this reduction in the air flow amount, the vacuum P1 in the vacuum chamber 32a is reduced to close the control valve 32. Then the vacuum Pe is raised once more and the above sequential operations will be repeated. It is to be noted that the ratio between the vacuum Pv and the vacuum Pe becomes equal to the ratio between the vacuum P1 and the vacuum P2, since the speed of these repeating operations is very fast.

Therefore, when the amount of the main intake air of the engine 4 is relatively small where the vacuum P1 is greater than Pv, the opening degree of the regulation valve 32 becomes large and the vacuum Pe becomes low. On the other hand, as the amount of the main intake air increases, the opening degree of the regulation valve 32 becomes smaller since the vacuum Pv increases, and consequently the vacuum Pe becomes high. Since the vacuum Pe acts in the vacuum chambers 24a and (when the electro-magnetic valve 13 is actuated) 12a as well as in the vacuum chamber 33a to open the air valve 33 and air control valves 12 and 24, the amount of the air flowing through the control air passage 35 becomes proportional to the amount of the secondary air which flows through the air control passage 11 when the electro-magnetic valves 13 and 26 are activated. Similarly, the amount of the main intake air supplied to the engine 4 via the intake air passage 3 becomes proportional to the amount of the secondary air flowing through the secondary air passage 11 during the actuation of the electro-magnetic valves 13 and 26. As a result, the vacuum Pe has a value proportional to the amount of the main intake air to the engine and forms the first control pressure for supplying the secondary air into the intake air passage 3, downstream of the throttle valve 5.

Figure 4:
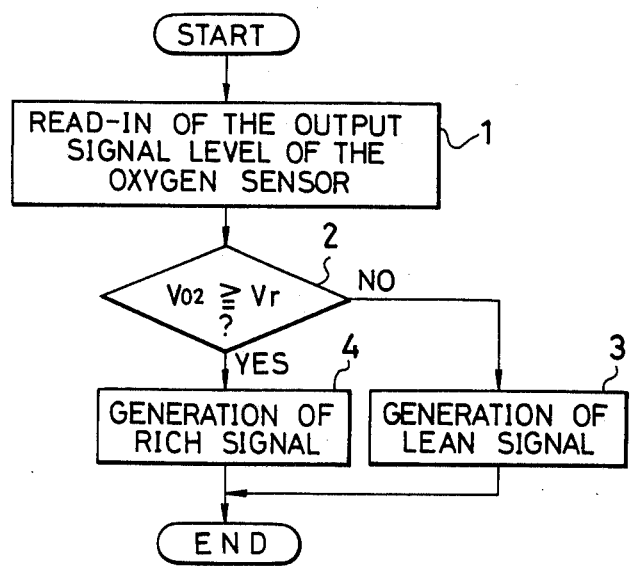
FIG. 4 is a flowchart showing an operation of the control circuit of the system of FIG. 1.

The operation of the control circuit 22 will be now explained with reference to the flowchart of FIG. 4.

When an ignition switch (not shown) is turned on and power is supplied to the control circuit 22, firstly the output voltage of the oxygen sensor 23 is read out by the control circuit 22, at a step 1. Since the oxygen sensor 23 is of the so-called flow-out type, the output voltage $VO_2$ thereof increases as the ambient condition becomes rich. After the reading out of the output voltage $VO_2$, the air/fuel ratio of the mixture is determined at a step 2, from this output voltage $VO_2$.

In this determination step, whether the air/fuel ratio is rich or lean is determined by comparing the output voltage $VO_2$ of the oxygen sensor 23 with a reference voltage Vr which corresponds to a stoichiometric air/fuel ratio. If $VO_2 < Vr$, the air/fuel ratio is determined to be lean, and a lean signal is applied to the drive circuit 21 at a step 3 to shift the air/fuel ratio to the rich side. On the other hand, if $VO_2 \geq Vr$, the air/fuel ratio is determined to be rich, and a rich signal is applied to the drive circuit 21 at a step 4 to shift the air/fuel ratio to the lean side.

Thus, when the lean signal or the rich signal is applied to the drive circuit 21 from the control curcuit 22, the drive circuit makes the electro-magnetic valve 13 inactivated by failing to supply the drive current of the solenoid 13a in accordance with the lean signal or makes the same activated by supplying the drive current of the solenoid 13a in accordance with the rich signal.

When the output signal of the control circuit 22 turns from the lean signal to the rich signal, the electro-magnetic valve 13 is activated to close the side of the atmospheric pressure passage 16 and at the same time make communication between the pressure passage 14 and the vacuum passage 15. As a result, the vacuum in the vacuum chamber 12a gradually approaches to the vacuum Pe because the vacuum Pe is supplied from the vacuum control part 31 to the vacuum chamber 12a via the orifice 17, and consequently the opening degree of the air control valve 12, i.e., the sectional area of the air control passage 11a gradually increases to increase the supply amount of the secondary air. When the vacuum in the vacuum chamber 12a has reached a value equal to the vacuum Pe, the amount of the secondary air flowing through the air control passage 11a becomes proportional to the amount of the main intake air, thus the engine 4 is supplied with the secondary air whose amount is proportional to the main intake air amount.

Next, when the output signal from the control circuit 22 turns from the rich signal to the lean signal, the electro-magnetic valve 13a is inactivated and the side of the vacuum passage 15 is closed and at the same time, the pressure passage 14 is communicated with the atmospheric pressure passage 16. As a result, the vacuum in the vacuum chamber 12a gradually approaches the atmospheric pressure value because atmospheric pressure is supplied to the vacuum chamber 12a via the orifice 19, to gradually reduce the sectional area of the air control passage 11a and also reduce the amount of the secondary air. When the pressure in the vacuum chamber has become equal to the atmospheric pressure, the air control valve 12 closes to block the air control passage 11a, and the supply of the secondary air to the engine 4 is stopped.

The on/off signal produced by the on/off signal generating circuit 28 is, for example, in the form of a square pulse train with a predetemined repetition rate, and the duty ratio of the on/off signal is 50% for example. The drive circuit 27 which receives the on/off signal from the on/off signal generating circuit 28, intermittently supplies a drive signal to the solenoid 26a and in turn the electro-magnetic valve 26 opens and closes the air control passage 11b at predetermined intervals shorter than the interval of the generation of the rich and lean signals. Further, since the vacuum chamber 24a of the air control valve 24 is applied with the vacuum Pe, the air control valve 24 causes the variation of the sectional area of the air control passage 11b according to the magnitude of the vacuum Pe. Therefore, when the electro-magnetic valve 26 is opened, the secondary air flows through the air control passage 11b in an amount proportional to the amount of the main intake air of the engine.

FIGS. 5A through 5E are diagrams showing the amount of the secondary air flowing through the air control passage 11a and the air control passage 11b, and the waveforms of the rich signal and the lean signal generated by the control circuit 22.

Figure 5A:
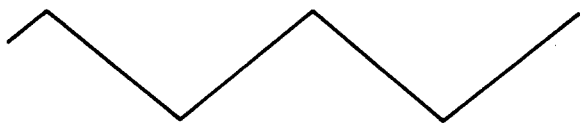
FIGS. 5A to 5E are diagrams showing the variation of the amount of the secondary air and the waveform of the rich and lean signals in the case of the air/fuel ratio control system of FIG. 3.
Figure 5B:

Specifically, the amount of the secondary air flowing through the air control passage 11a gradually increases and decreases as shown in FIG. 5A. On the other hand, the amount of the secondary air flowing through the air control passage 11b varies in a pulsating manner, as shown in FIG. 5B. Since the amount of the secondary air supplied through the secondary air passage 11 into the downstream of the throttle valve 5 is equal to the sum of the amounts of respective flows through the air control passages 11a and 11b, it varies in the manner shown in FIG. 5C.

Figure 5C:
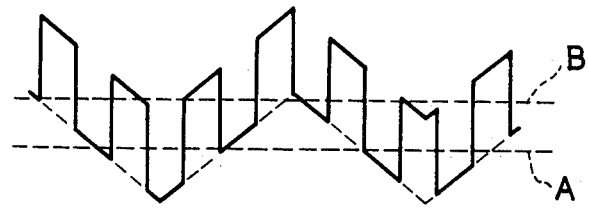
Figure 5D:
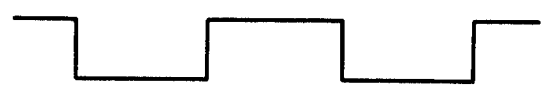

FIG. 5C also shows a dashed line A which ilustrates a threshold value of the amount of the secondary air corresponding to the stoichiometric air/fuel ratio in the case of the air/fuel ratio control only utilizing the integration operation. In this state, the control circuit 22 produces the rich signal and the lean signal alternately as shown in FIG. 5D.

Figure 5E:

On the other hand, if we assume that the threshold level is raised to the level shown by the dashed line B of FIG. 5C when the open/close operation of the air control passage by means of the electro-magnetic valve 26 is performed in addition to the integration operation, then the rich signal and the lean signal are produced in the manner shown in FIG. 5E.

Therefore, the number of inversions of the output signal of the control circuit 22 per unit time increases as compared with the case in which only the integration operation is utilized. By this rapid change between the rich signal and the lean signal, the period in which the secondary air amount is increased by the integration operation, or in which the secondary air amount is decreased, is shortened. Thus, an immediate change between the increment and decrement controls of the amount of the secondary air is enabled.

Further, since the timing of generation of the rich signal and the lean signal becomes irregular, for instance as illustrated in FIG. 5E, when the amount of the secondary air changes in a manner as shown in FIG. 5C, the actual change in the amount of the secondary air will be much more complicated. In that case, however, the interval of the turn over of the direction of the air/fuel ratio control will also be shortened. In addition, the speed of the increment and the decrement of the amount of the secondary air is always maintained constant. With these reasons, the width of the deviation of the air/fuel ratio from the central value of the control, such as the stoichiometric value is reduced.

Figure 6:
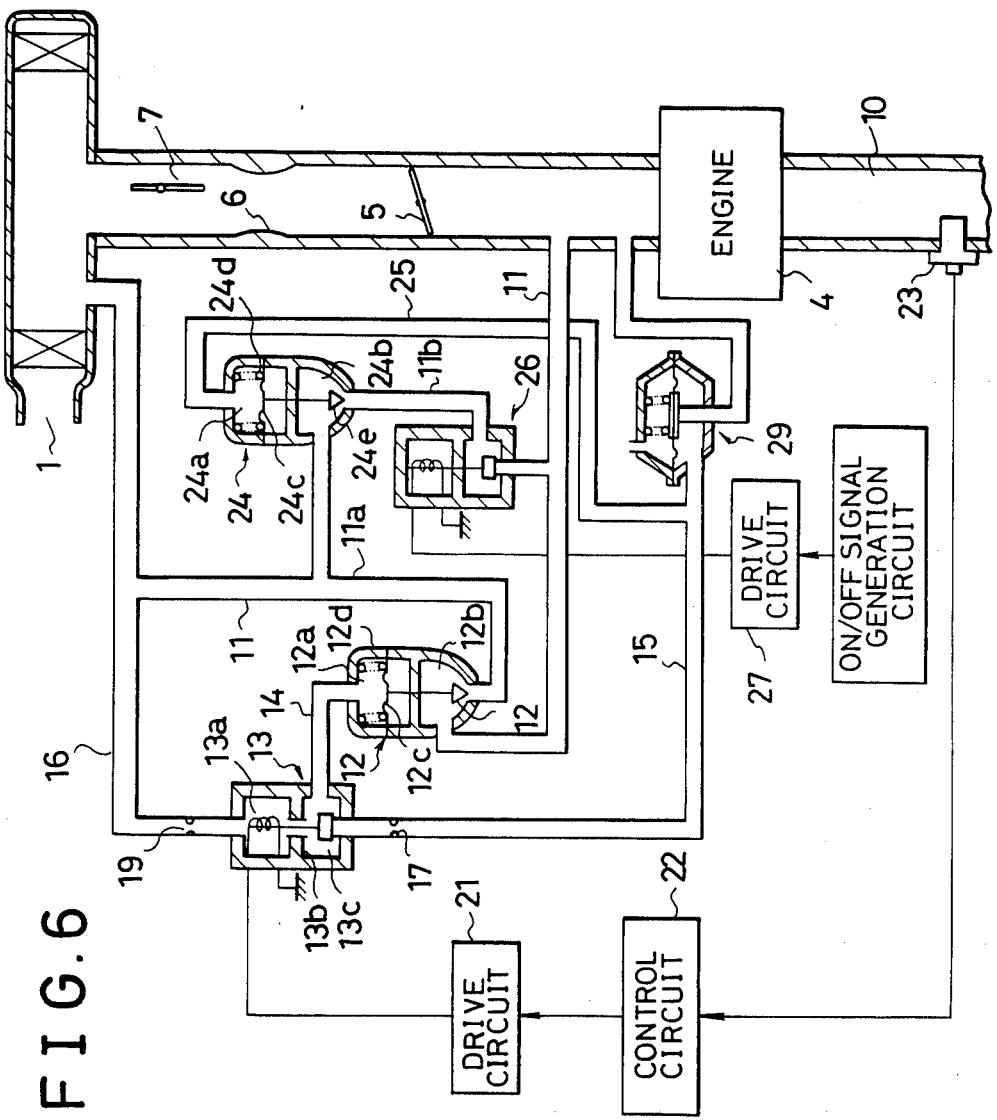
FIG. 6 is a schematic diagram showing a modification of the first embodiment shown in FIG. 1, in which the vacuum control part 31 of FIG. 3 is replaced by a constant vacuum control valve 29.

FIG. 6 shows a schematic diagram of the second embodiment of the air/fuel ratio control system of the invention.

In the case of this embodiment, the vacuum passage 15 is communicated to the downstream of the throttle valve 5, and a constant vacuum control valve 29 is provided in the vacuum passage 15 on the side of the throttle valve 5 from the orifice 17, instead of the vacuum control part 31 of the first embodiment. The constant vacuum control valve 29 is constructed to stabilize the vacuum of the downstream of the throttle valve to a vacuum Pr having a predeademined magnitude when said vacuum is greater than the predetermined value. The other portions of this system are identical with those of the system of FIG. 3, and therefore, the explanation thereof is omitted.

It will be appreciated from the foregoing, in the air/fuel ratio control system of the present invention, first and second fluid supply passages for correcting the amount of the fuel or air to be supplied to the engine, are provided. A flow control valve for the integration operation according to the air/fuel ratio detected from the composition of the exhaust gas and controlling the air/fuel ratio is provided in the first fluid supply passage. Further, an open/close valve which is opened and closed, without regard to the air/fuel ratio signal, and at intervals shorter than the period of turn over of the air/fuel ratio signal, is provided in the second fluid supply passage. Thus, the turn over of the direction of the air/fuel ratio control takes place more frequently as compared with the air/fuel ratio control of the integration operation only. Therefore, the width of the deviation of the air/fuel ratio from the central value of the control is reduced to improve the exhaust gas purification efficiency by means of the three-way catalytic converter.

Furthermore, in the case of the air/fuel ratio control system of the present invention, the period of opening and closing of the open/close valve disposed in the second fluid supply passage is desirably established to be shorter than the period of the turnover of the air/fuel ratio signal and at the same time longer than a level above which the variation of the oxygen concentration in the exhaust gas at the entrance of the three-way catalytic converter, which is necessary for the air/fuel ratio control, appears. Specifically, the efficiency of the purification of the exhaust gas increases as the period of the opening and closing of the open/close valve becomes shorter.

Figure 3:
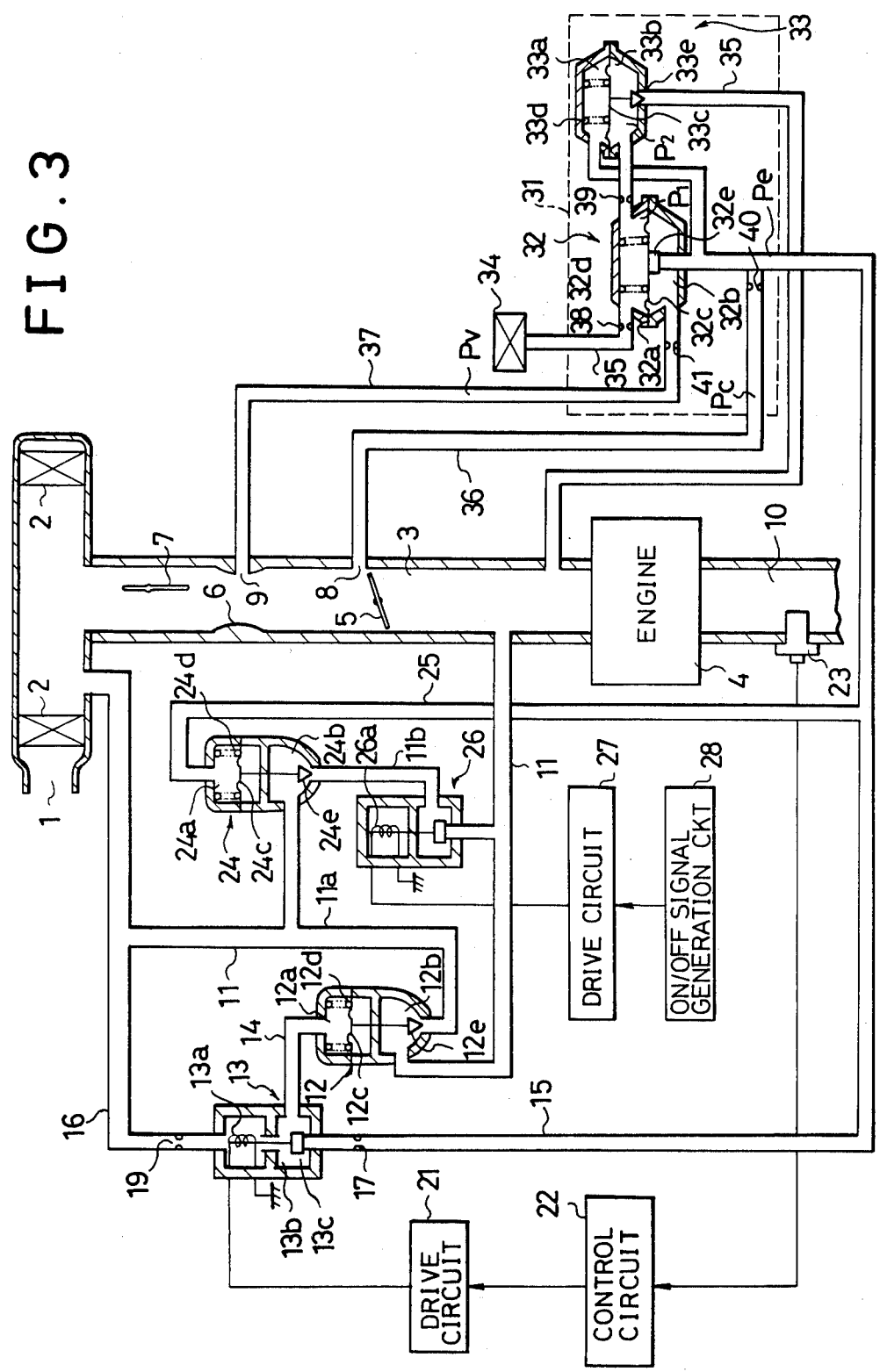
FIG. 3 is a schematic diagram of a first embodiment of the air/fuel ratio control system according to the present invention.
Figure 7:
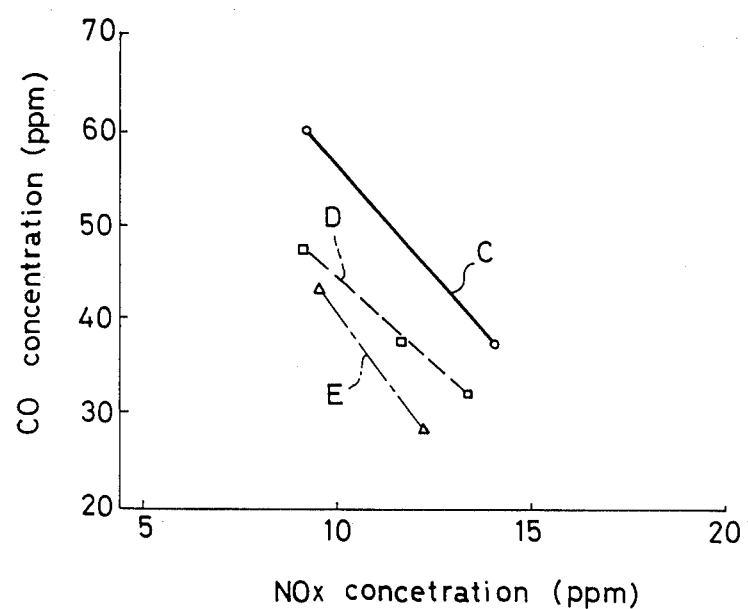
FIG. 7 is a diagram showing the relation between the concentration of noxious component in the exhaust gas and the period of opening and closing of the open/close valve.

FIG. 7 is a diagram showing the relation between the concentration of CO and the concentration of NOx observed in the case of the air/fuel ratio control system of FIG. 3. As shown by the solid line C, the level of the concentration of CO and the concentration of NOx is relatively high when only the integration operation is performed. On the other hand, when the open/close valve is operated with a period of 400 ms, the concentrations of CO and NOx are reduced as illustrated by the dashed line D. Moreover, when the open/close valve is operated with a period of 200 ms, the CO and NOx concentrations are further reduced as illustrated by the partly dotted line E.

Figure 8:
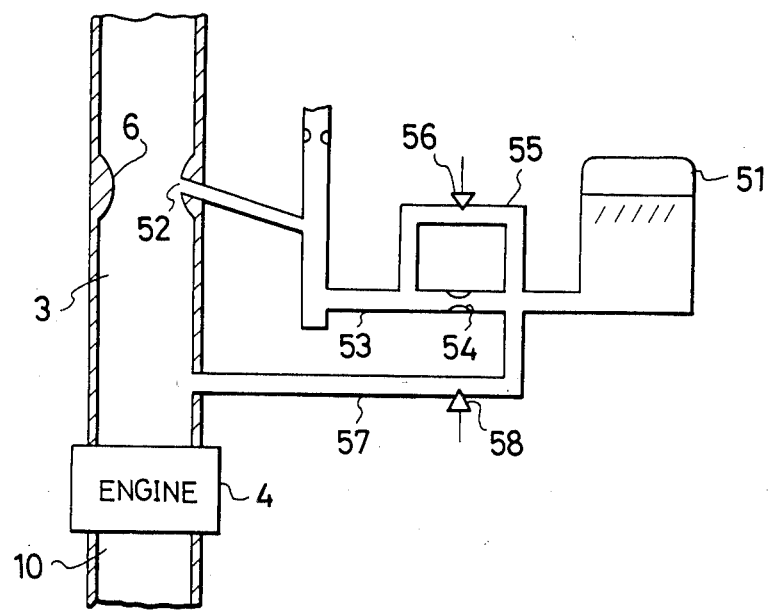
FIG. 8 is a schematic diagram showing another example of the application of the present invention to an internal combustion engine.

It will be understood that the foregoing description is for illustrative purpose only, and is not intended to limit the scope of the invention. Rather, there are numerous equivalents to the preferred embodiments, and such are intended to be covered by the appended claims. As an example, instead of controlling the amount of the secondary air to be supplied to the engine, the present invention can be adapted to a system in which the amount of the fuel to be supplied to the engine is corrected. In that case, as shown in FIG. 8, a first fuel control passage 55 can be provided to by-pass a main jet 54 of a fuel passage 53 which leads from a fuel tank 51 to a fuel nozzle 52 of a carburetor. A control valve 56 which performs the integration operation according to the result of the determination of the air/fuel ratio is suitably provided in the first fuel control passage 55. Further, a second fuel control passage 57 can be provided to form a direct communication between the fuel tank and the intake air passage 3. An open/close valve is disposed in the second fuel supply passage to open and close the second fuel supply passage with a predetermined period.

What is claimed is:

1. An air/fuel ratio control system for an internal combustion engine provided with a three-way catalytic converter in the exhaust system, comprising:

an air/fuel ratio signal generating means responsive to rich and lean conditions of the air/fuel ratio in a composition of an exhaust gas of the engine for producing an air/fuel ratio signal representing said air/fuel ratio;

a first fluid supply passage connected to the engine for supplying one of a secondary air and a supplemental fuel to the engine;

a second fluid supply passage connected to the engine for supplying said one of the secondary air and the supplemental fuel to the engine;

a control valve disposed in the first fluid supply passage for controlling the amount of the fluid flowing through the first fluid supply passage;

a control means for controlling an opening degree of said control valve to cause a sectional area of the first fluid supply passage to be gradually increased or decreased in accordance with said air/fuel ratio signal; and an open/close valve disposed in said second fluid supply passage, for intermittently opening and closing said second fluid supply passage at predetermined time intervals and without regard to said air/fuel ratio signal.

2. An air/fuel ratio control system as set forth in claim 1, wherein said control valve takes the form of a pressure controlled valve having a pressure chamber and constructed to vary the sectional area of the first fluid passage in accordance with a pressure level of a fluid supplied to the pressure chamber from said control means.

3. An air/fuel ratio control system as set forth in claim 2, wherein said control means comprises a first control pressure generating means for generating a first control pressure to open said control valve, a second control pressure generating means for generating a second control pressure to close said control valve, and communication means for directing either one of said first and second control pressure to said pressure chamber in accordance with said air/fuel ratio signal.

4. An air/fuel ratio control system as set forth in claim 3, further comprising a second control valve disposed in said second fluid supply passage and having a pressure chamber, said second control valve being operative to vary a sectional area of said second fluid supply passage in accordance with a pressure level in the pressure chamber, said first control pressure being supplied to said pressure chamber of the second control valve.

* * * * *